US007272295B1

(12) United States Patent
Christopher

(10) Patent No.: US 7,272,295 B1
(45) Date of Patent: Sep. 18, 2007

(54) COMMERCIAL SKIP AND CHAPTER DELINEATION FEATURE ON RECORDABLE MEDIA

(75) Inventor: Lauren Ann Christopher, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1028 days.

(21) Appl. No.: 10/129,636

(22) PCT Filed: Nov. 1, 2000

(86) PCT No.: PCT/US00/30072

§ 371 (c)(1),
(2), (4) Date: Oct. 2, 2002

(87) PCT Pub. No.: WO01/35409

PCT Pub. Date: May 17, 2001

Related U.S. Application Data

(60) Provisional application No. 60/164,791, filed on Nov. 10, 1999.

(51) Int. Cl.
*H04N 5/91* (2006.01)
(52) U.S. Cl. ....................................... 386/46
(58) Field of Classification Search ........... 386/1, 386/45, 46, 125–126; 358/908; 348/700–702
See application file for complete search history.

(56) References Cited

U.S. PATENT DOCUMENTS 5,343,251 A   8/1994   Nafeh .................. 348/571
5,668,917 A   9/1997   Lewine ................. 386/52
5,692,093 A  11/1997   Iggulden et al. ........ 386/46
5,696,866 A  12/1997   Iggulden et al. ........ 386/46
5,913,010 A * 6/1999   Kaneshige et al. ...... 386/70
5,920,360 A   7/1999   Coleman, Jr. .......... 348/700
5,959,697 A   9/1999   Coleman, Jr. .......... 348/700

(Continued)

FOREIGN PATENT DOCUMENTS

EP          0762756          3/1997

(Continued)

OTHER PUBLICATIONS

Book, "DVD Demystified", pp. 141-149.

*Primary Examiner*—Thai Q. Tran
*Assistant Examiner*—Tat Chi Chio
(74) *Attorney, Agent, or Firm*—Joseph J. Laks; Ronald H. Kurdyla; Joel M. Fogelson

(57) ABSTRACT

A method and apparatus for controlling an MPEG video media recording device to automatically identify and selectively skip segments of a video signal, such as commercial advertisements, during a recording session. During an MPEG video data recording session the system continuously monitors the video data being recorded to detect a scene change occurring over one or more image fields. In response to a detected scene change, the system stores in a file a time and record location on the media corresponding to the occurrence of the scene change. Depending upon the time interval between several of the detected scene changes, the system identifies a corresponding video segment as either a commercial advertisement or a chapter boundary. By identifying the segments in this way, the playback presentation can then be selectively controlled.

14 Claims, 5 Drawing Sheets

U.S. PATENT DOCUMENTS

| | | | |
|---|---|---|---|
| 5,987,210 A * | 11/1999 | Iggulden et al. | 386/46 |
| 6,091,884 A * | 7/2000 | Yuen et al. | 386/83 |
| 6,154,222 A * | 11/2000 | Haratsch et al. | 345/473 |
| 6,285,818 B1 * | 9/2001 | Suito et al. | 386/46 |
| 6,400,378 B1 * | 6/2002 | Snook | 715/716 |

FOREIGN PATENT DOCUMENTS

| | | |
|---|---|---|
| EP | 0993188 | 4/2000 |
| FR | 2633132 | 12/1989 |
| WO | 99/22513 | 5/1999 |

* cited by examiner

COMMERCIAL SKIP AND CHAPTER DELINEATION FEATURE ON RECORDABLE MEDIA

This application claims the benefit under 35 U.S.C. § 365 of International Application PCT/US00/30072, filed Nov. 1, 2000, which was published in accordance with PCT Article 21(2) on May 17, 2001 in English; and which claims benefit of U.S. provisional application Ser. No. 60/164,791 filed Nov. 10, 1999.

BACKGROUND OF THE INVENTION

1. Technical Field

The inventive arrangements relate generally to methods and apparatus providing advanced operating features for audio only, video only and both video and audio programs recorded on disk media, for example recordable digital video disks, hard drives and magneto optical disks.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

In many cases, the program presentations are recorded in the viewer and/or listener's absence, for presentation at a later, more convenient time. This is referred to as time shifting the program. At other times, a program is being viewed and/or listened to without being recorded, and with out any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales.

One feature which is desirable for recordable DVD devices as well as any other MPEG media recorder, is the ability to automatically identify and selectively skip segments of a recorded video signal. For example, such a feature may be useful for automatically editing out commercial messages from recorded television broadcast signals. "Commercial Skip" is an important feature in the field of video cassette recorders. In this regard, various systems have been disclosed in the context of video cassette recorders to address this problem.

Present commercial skip technology in VCRs looks for black frames 15, 30 or 60 seconds apart. These black frames are used to generate a map of possible commercials in recorded television programming. However, this conventional approach is not entirely satisfactory because it requires one to wait while the system returns to the beginning of the segment to mark the commercial. Moreover, because conventional VCRs do not use MPEG type encoding, they cannot take advantage of more sophisticated video processing methods which can be applied for detecting video program transitions such as may occur during commercial advertisements and between chapters of a video presentation. Further to the extent that conventional VCRs can use other transitional effects as cues to delineate chapter boundaries, the media lacks facility to conveniently enable demarcation and selective playback beginning at such chapter boundaries.

SUMMARY OF THE INVENTION

Then invention concerns a method and apparatus for controlling a MPEG video media recording device to automatically identify and selectively skip segments of a video signal, such as commercial advertisements, during a recording session. During an MPEG video data recording session the system continuously monitors the video data being recorded to detect a luminance gradient (or other scene change detection method) occurring over one or more image fields. In response to a scene change, the system stores in a file a time and record location on the media corresponding to the occurrence of the scene change. According to one aspect, the record location on the media corresponding to the detected scene change can be defined by a sector on the disc, a picture start code, or for DVD, the Nav-Pac (navigation pack) number corresponding to a VOBU boundary.

Depending upon the time interval between each successive one of the detected scene changes, the system identifies a corresponding video segment as either a commercial advertisement or a chapter boundary. By identifying the segments in this way, the playback presentation can then be selectively controlled. In particular, system first determines whether the interval corresponds to a predetermined range of known values associated with commercial advertisements. If the interval falls within the predetermined range of known values associated with the commercial advertisements then the system can insert a navigation command in a playback control file contained on the recordable media. The playback control command can be used later during playback to skip, fast-forward, or index the video segment corresponding to the commercial advertisement. Alternatively, if the interval does not fall within the predetermined range of known values associated with the commercial advertisements, the system can insert a menu button in a menu file for permitting a user to selectively begin playback of a particular chapter defined by the video segment.

According to the inventive arrangements, the recording media upon which the MPEG video is stored can be selected from the group consisting of a DVD disc, a computer hard drive, magnetic tape and magneto optical discs. In fact the system is also applicable to any recordable device (e.g., hard drive or tape) that uses an MPEG encoder or directly records an MPEG bitstream.

DETAILED DESCRIPTION OF THE PREFERRED EMBODIMENTS

Recordable DVD Device

Figure 1:
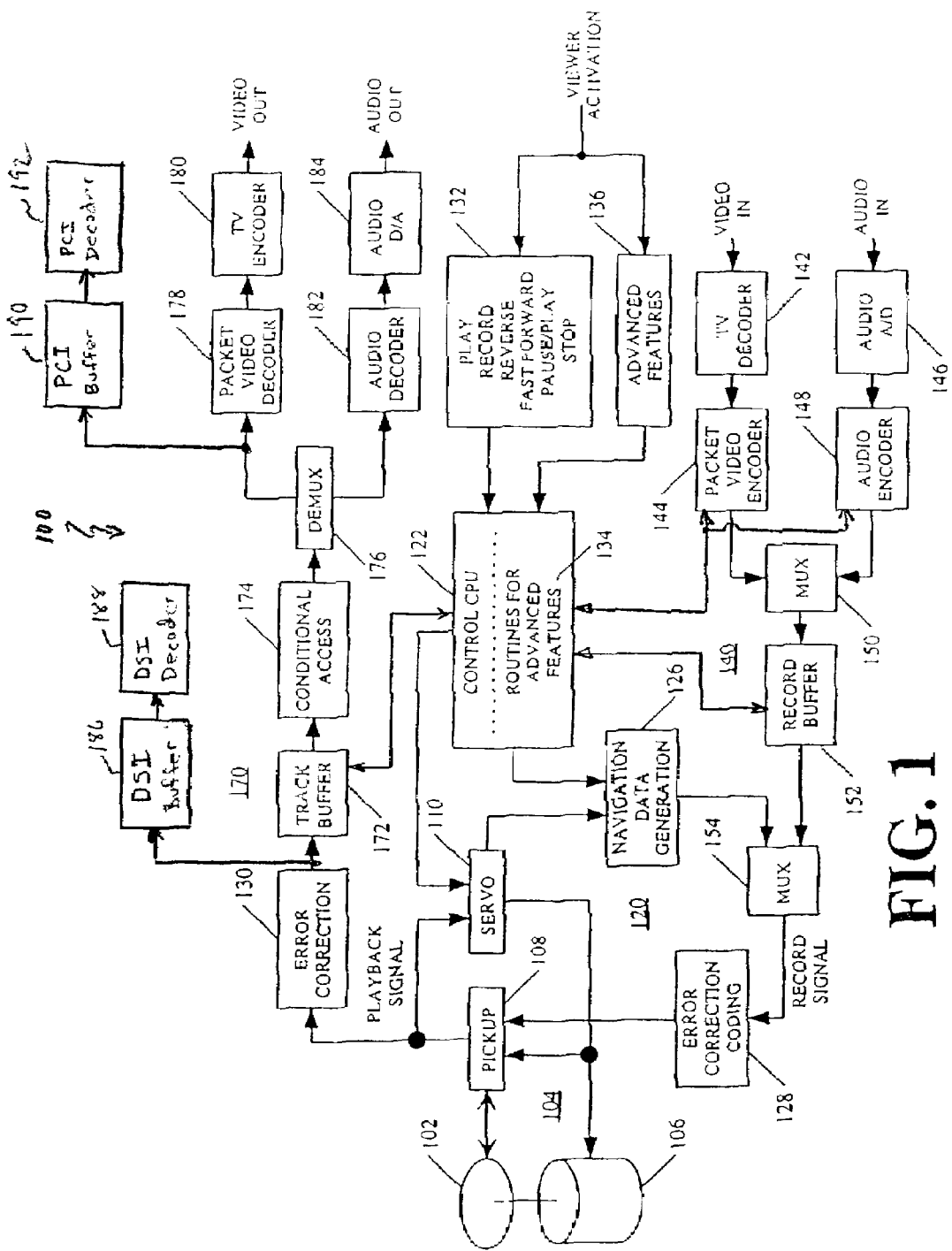
FIG. 1 is a block diagram of a rewritable DVD device that can be provided with one or more advance operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140.

In conventional recordable DVD devices, the navigation data generation circuit 126 will generate conventional navigation packet data to be stored on the disc with the video data. In accordance with the inventive arrangements, the navigation data generation circuit can supply certain additional information for inclusion in the navigation packet. The additional information can be used for improved performance for selected trick mode playback operations as shall subsequently be described in more detail.

The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152. Control and data interfaces are also preferably provided for permitting CPU 122 to control the operation of packet video encoder 144 and audio encoder 148. Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, slow play, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As groups of audio and video data packets are created, they are combined in MUX 154 with appropriate navigation packets generated in the navigation data generation block 126. The packets are then sent on to the error correction coding circuit 128. Error correction coding circuit 128 can also be deemed to be part of the input path 140.

As a practical matter, the smallest addressable unit on the spiral track of a DVD is an ECC (error correction code) block of 16 sectors, where each sector includes 2048 bytes of user data. A group is a number of ECC blocks, for example 12. Each group of blocks represents approximately 0.5 seconds of combined video and audio program material. The amount of linear space along the spiral track needed to record a group of ECC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing. Accordingly, it can also appear that the track buffer 172 needs to be only large enough to store one segment of data, also corresponding to approximately 0.5 seconds of audio and video program material.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. A PCI buffer 190 and PCI decoder 192 can be provided for decoding presentation control information contained in navigation packets contained on the disc. The output processing path 170 can be deemed to include the error correction circuit 130, as noted.

DSI buffer 186 is provided for receiving disc search information (DSI) contained within the navigation packets. The DSI decoder is used for decoding the DSI information contained within navigation packets which shall be described in more detail below.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
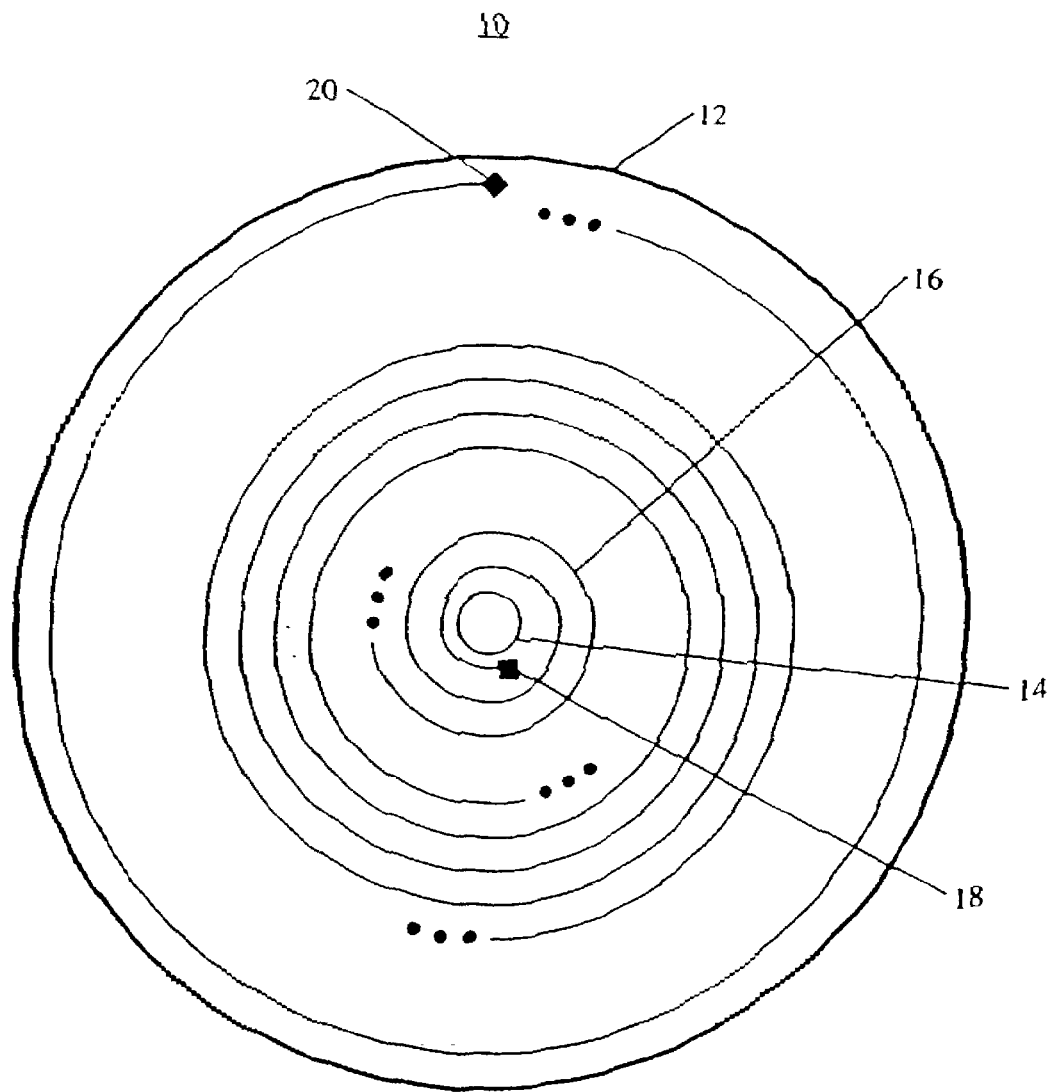
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12. The re-writable DVD can consist of two substrates bonded together by an adhesive layer forming a 1.2 mm thick disk. A center hole 14 can be formed in the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (_____) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advanced features in accordance with the inventive arrangements utilize backward recording, that is, from a larger radius part of the spiral to a smaller radius part of the spiral. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

The inventive arrangements have been described herein relative to recordable DVD media. Those skilled in the art will appreciate, however, that the invention is not limited in this regard. Rather, the improvements to DVD navigation information for improved trick modes as described herein can be used with any type of disc media, including but not limited to DVD-R type media.

DVD Data Structures

Figure 3:
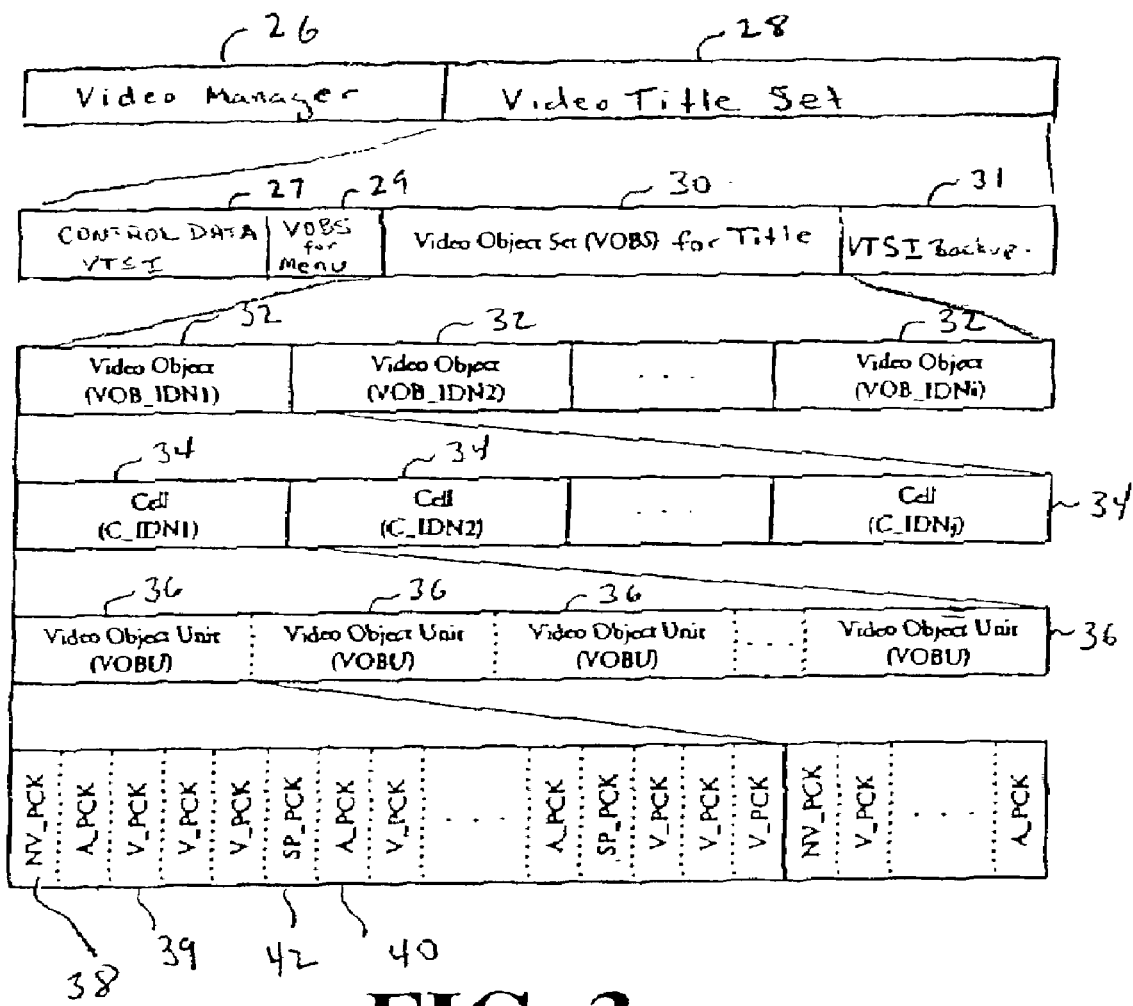
FIG. 3 is a diagram useful for explaining the organization of video object units in video object sets.

As shown in FIG. 3, each DVD contains a video manager 26 and video title set (VTS) 28. The VTS includes video title set information (VTSI) 27, an optional video object set for menu 29, one or more VOBS for title 30 which contains the actual title content, and a VTSI backup 31. Each VOBS 30 is comprised of a plurality of video objects 32. Each video object 32 includes a plurality of cells 34. Each VOBS also includes a collection of pointers to cells. In this way, the VOBS data links cells together and indicates in what order the programs or cells are to be played. Cells within a particular VOBS can be flagged for play in any desired order. For example, they can be played sequentially or randomly.

Each cell includes a plurality of VOBUs 36. Each of the VOBUs 36 in which the video content of the disc resides typically contains 0.4 to 1.0 seconds of presentation material. Each VOBU 36 is a sequence of data packs in recording order. Each VOBU starts with exactly one navigation pack (NV_PCK) 38 and could encompass all of the following kinds of packs, including video packs (V_PCK) 39, audio packs (A_PCK) 40 and sub-picture packs (SP_PCK) 42. Each VOBU is nominally comprised of one group of pictures (GOP). Typically, the VOBU contains about 12 or 16 pictures, together with associated audio data.

The NV_PCK conventionally contains presentation control information (PCI) as well as disc search information (DSI) for the video object unit in which they are included. The presentation control information contains details of the timing and presentation of a program. The disc search information is composed of relative addresses of NV packs of VOBUs in the forward and backward directions. Each NV_PCK also includes the data size of the first reference picture in a GOP and the end address for the first three reference pictures in the VOBU. This is the only clue given as to the structure of the VOBU.

A disc containing one main title can be broken down into several chapters which can delineate a particular story. Chapters forming parts of video titles are a useful construct as they can function as a marker or branch point in the video presentation. DVD navigation data includes information and a command set for control of the playback sequence. Menus can be provided on discs to allow content selection. For example, a user can select through a user menu a particular video title (movie), or parts of titles (chapters).

Navigation commands are particularly useful for facilitating flow control in the video presentation. Each video title contains at least one program chain. The program chain is a collection of pointers to cells 34. The program chain links cells together and indicates in what order the cells are to be played. Each program chain can optionally begin with a set of precommands, followed by cells 34 which each have one optional command. Each command can include up to three instructions, including instructions for flow control such as goto, link, jump, exit, and so on. Program chain information (PGCI) is contained in the presentation control information (PCI) portion of the video data stream. The PGCI can be thought of as a playback control file for controlling the sequence and presentation of the cells comprising the video title.

Commercial Skip and Chapter Delineation

Figure 4:
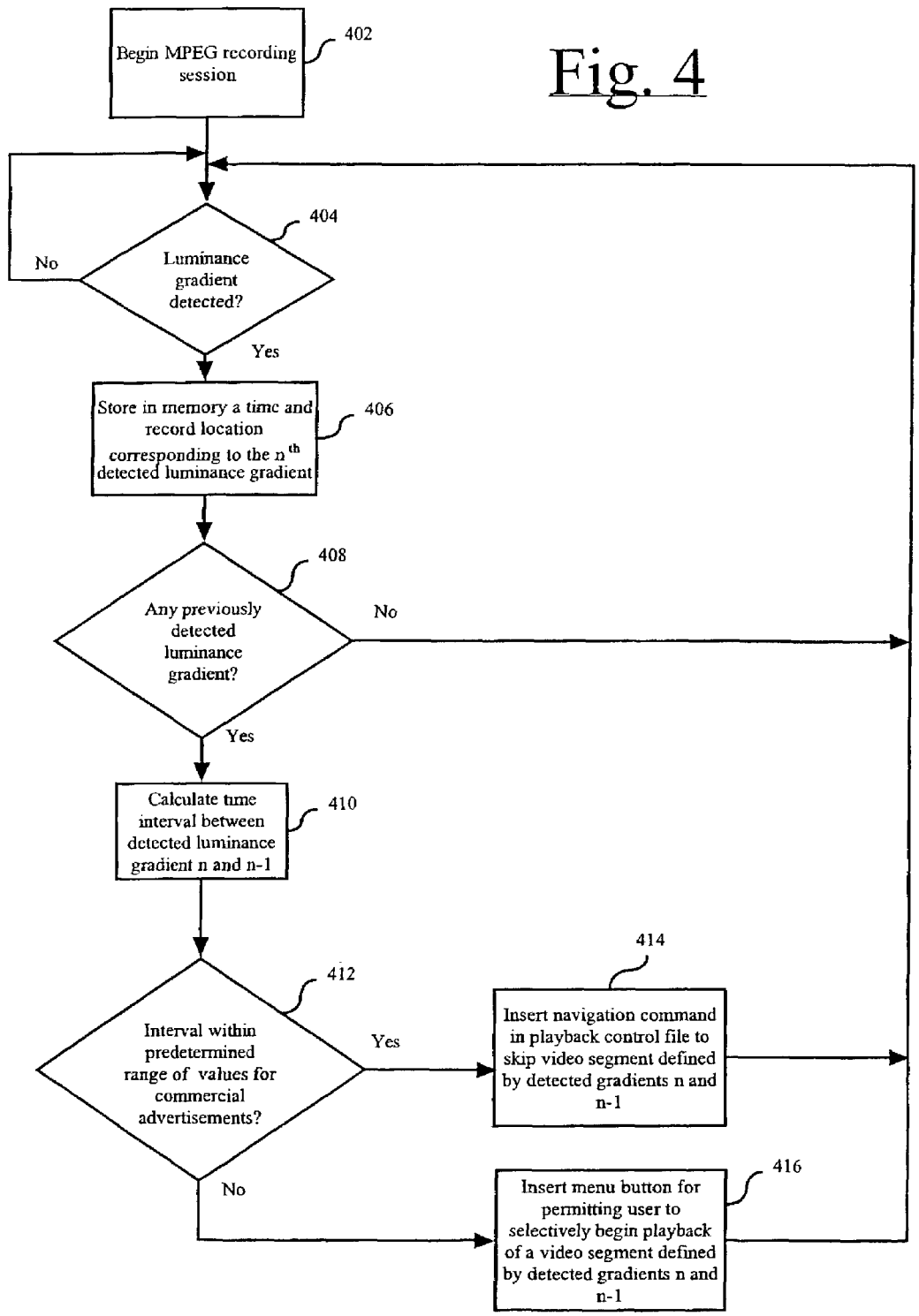
FIG. 4 is a flow chart useful for explaining a process for commercial skip and chapter delineation.

FIG. 4 is a flow chart illustrating a process for commercial skip and chapter delineation for an MPEG recording. As shown therein, the process begins in step 402 when a user begins an MPEG recording session with the commercial skip and chapter delineation feature activated. Record operation can be user selected by means of a control buffer 132. Advanced features such as commercial skip and chapter delineation as described herein can be activated by means of a separate advanced feature buffer 136. These controls are used as inputs for CPU 122 and for selecting appropriate routines 134.

In step 404, the system analyzes the video signal being recorded to detect a cue which signifies a scene change transition to a commercial advertisement or a chapter delineation within a movie. Any suitable transitional cue can be used for this purpose. According to a preferred embodiment, however, an image fade can be selected as the transition cue. An image fade will commonly occur when a program transitions over a series of images to a commercial advertisement in a television broadcast. Similarly, such a transition cue can indicate a chapter delineation in a movie or video title.

According to a preferred embodiment, detection of a luminance gradient as described herein can be performed as described in U.S. Pat. No. 5,561,477 which patent is incorporated herein in its entirety by reference. As described therein, in a motion compensated predictive coding data compression system, such as MPEG, adjacent image frames can be analyzed to detect a luminance gradient. The frames are divided into several segments as described therein and the sum of the absolute pixel value differences between corresponding segments from adjacent frames is obtained for each of two pairs of adjacent frame segments. The ratio of the two frame differences is obtained for each segment. Fading is indicated if the ratio remains substantially constant for all of a predetermined number of regions. The signal processing associated with detection of a luminance gradient can be performed by control CPU 122 or by a separate dedicated signal processor associated with the packet video encoder.

If fading is not detected, the system continues to monitor the video signal being recorded in step 404. However, if fading is detected, then the system continues on to step 406. In step 406, the system stores in a memory location or file an indication of the time and recording location on the media corresponding to the $n^{th}$ detected luminance gradient. Thus, a record is created of the relative time during the recording session when the fade occurred and the location on the recording media where the fade was recorded.

Figure 5:
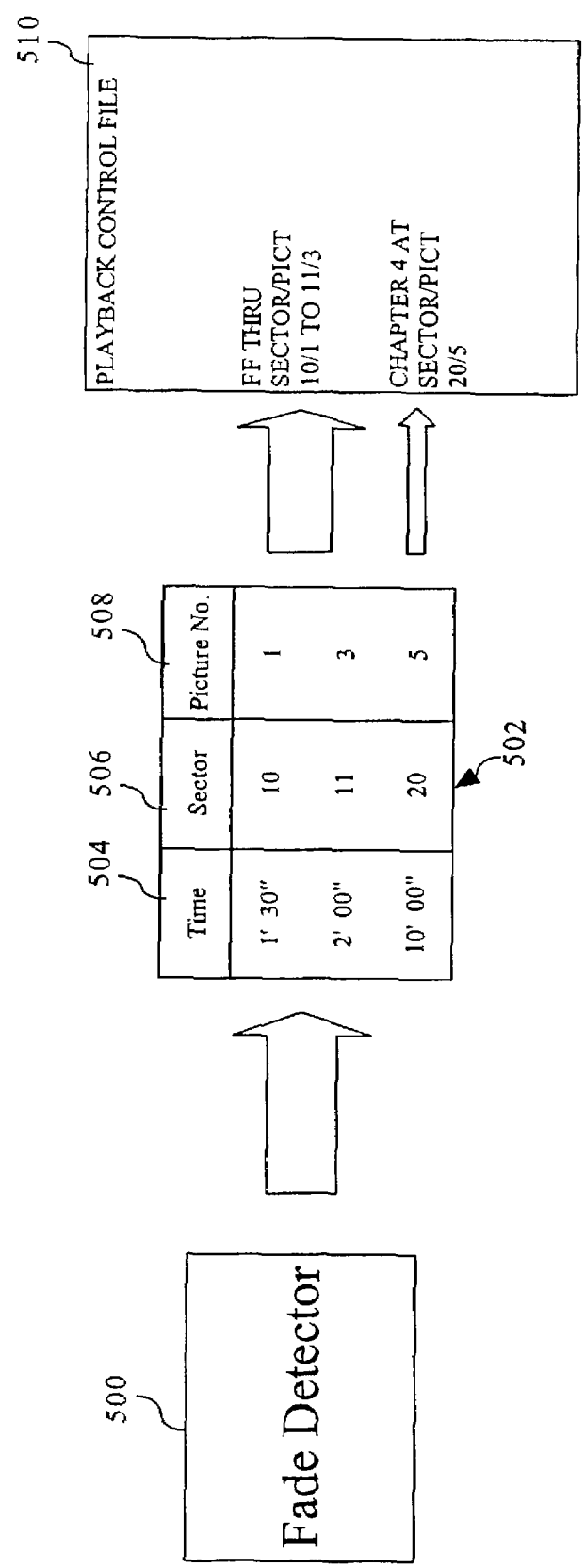
FIG. 5 is a block diagram useful for explaining the how a playback control file can be modified.

According to a preferred embodiment shown in FIG. 5, the file 502 is created by the fade detector 500. The fade detector 500 may be implemented by CPU 122 together with suitable program routines 134. The file 502 thus created will include a record or pointer to the elapsed time 504, to the disc sector 506 and to the particular picture 508 within the sector. This data file 502 can, for example, be maintained in RAM (not shown) associated with control CPU 122.

In step 408, the system determines whether any luminance gradient associated with a fade has been previously detected by the system. If not, the system proceeds to step 404 and continues to monitor for the next luminance gradient. If the system has previously detected a luminance gradient, then it continues on to step 410 where it calculates a time interval between the detected luminance gradients "n" and "n-1", "n-2", "n-3", etc. Thus, the system calculates the interval between the most recent detected gradient and several preceding gradients.

In step 412, the system determines whether the interval calculated in step 410 is within a predetermined range of values for commercial advertisements. These predetermined range of values are commonly approximately 30 or 60 seconds in conventional television advertising. However, the invention is not limited to these particular values and any other time intervals commonly associated with commercial television advertisements can also be included for this evaluation in step 412. Thus, for example, if 15 second television advertisements are known to be used, then a 15 second interval can be included in the predetermined range of values for commercial advertisements.

According to a preferred embodiment, the predetermined range of values for commercial advertisements can provide a deviation window so as to include commercial advertisements which are slightly shorter or longer than expected. In this regard, a few seconds deviation from the nominal values of 30 or 60 seconds should be sufficient. In any case, the range of values can be selected so that they are sufficiently broad to include most commercial advertisements.

In step 412, if the interval of the video segment defined by the detected luminance gradient does fall within the predetermined range of values for commercial advertisements, then the system proceeds to step 414. In step 414, the CPU 122 can cause a flow control command to be inserted in a playback control file 510 of the MPEG video recording. An example of the foregoing process is shown in FIG. 5, where the first two detected fades occur at 1' 30" and 2' 00" respectively. The system determines that there is a 30 second interval between these two detected fades and therefore concludes that the associated video segment must be a commercial. Accordingly, the playback control file 510 is modified in this case to cause the media player device to fast forward or skip from record location 1 (sector 10, picture 1) to record location 2 (sector 11, picture 3).

The playback control file 510 can be any file which is used to control the playback sequence of the MPEG video. For example, in a recordable DVD system, the playback control file or instructions 510 can be DVD navigation data such as a program chain information (PGCI). Alternatively, the flow control file 510 can comprise one or more navigation packs, one of which is included with each VOBU. In any case, the flow control instruction which is inserted in step 414 is preferably selected and implemented to cause the MPEG media player to fast forward or skip during playback the video segment delineated by the detected luminance gradients.

Alternatively, if the interval between fades in step 412 does not fall within the predetermined range of values for commercial advertisements, then the system will continue on to step 416. In step 416, it is assumed that the detected fade or luminance gradient which has been detected must correspond to the beginning or the end of a chapter within a program. Accordingly, CPU 122 will cause a marker or command to be automatically inserted in a playback control file which will allow convenient access to the video segment occurring before or after the detected fade. For example, in the case of a recordable DVD device, a marker can be inserted in the PTT (Part of Title Table). This "marker" is the Navigation Packet number corresponding to the detected fade or scene change. This will become a DVD recordable standard chapter boundary. These "markers" can also be pre-processed before storage into the PTT. This may be done in order to make chapter boundaries relatively even, for example: about every 5 minutes of video playback. Such chapters can subsequently be used in conjunction with a chapter up/down command while playing the movie, allowing convenient user access to a chapter within the video. Alternatively, it could be used as the basis for an on-screen menu during the play of the movie or as an on-screen chapter disc menu. Alternatively, a menu button can be inserted and provided with a suitable flow control instruction in step 416. Thus a user can activate the menu button during a playback mode to cause playback to begin at the video segment defined by the detected gradient n. The system proceeds after step 414 or 416 to step 404 where it continues to monitor for the next luminance gradient during the recording session.

An example of the foregoing process is illustrated in FIG. 5. As shown therein, the system detects that the second and third fades occur at 2' 00" and 10' 00". The system then calculates the resulting interval to be 8 minutes. Since this time interval does not correspond to any known commercial interval, the system concludes that the fade must correspond to the end of a chapter. This information is then used to modify the playback file to create a chapter marker at the VOBU boundary corresponding to sector 20, picture 5. The chapter marker can then be used for permitting a user to access the particular video segment defined by the interval. Alternatively, a menu button can be created in a menu file associated with the MPEG recording on the media. The menu button can be used to directly access the selected video segment.

The invention claimed is:

1. A method for controlling a video media recording device to
automatically identify and selectively skip segments of a video signal during a recording session, comprising the steps of:
recording an video data on the recording media;
monitoring the video data to detect scene change;
responsive to each detected scene change, storing in a file a time and record location on said media corresponding to the occurrence of said scene change;
determining an interval between each successive one of said detected scene changes and at least one preceeding scene change, said interval in each instance defining a video segment;
comparing said interval with a range of values associated with commercial advertisements;
identifying a commercial advertisement for controlling a playback presentation when the interval is within the range of values; and
identifying a chapter boundary for controlling the playback presentation when the interval is outside the range of values.

2. The method according to claim 1 further comprising inserting a navigation command on said media in a playback control file to at least one of fast forward and skip said video segment during playback if said interval falls within said range of values associated with said commercial advertisements.

3. The method according to claim 1 further comprising inserting a menu button in a menu file of said recordable media for permitting a user to selectively begin playback of a chapter defined by said video segment if said interval does not fall within said range of values associated with said commercial advertisements.

4. The method according to claim 1 further comprising creating chapter boundaries within said recordable media responsive to a user chapter up/down command.

5. The method according to claim 1 wherein said record location on said media corresponding to said detected scene change is defined by at least one of a sector and picture start code, and a VOBU number.

6. The method according to claim 1 wherein said recording media is selected from the group consisting of a DVD disc, a computer hard drive, magnetic tape and magneto optical discs.

7. The method according to claim 1 wherein said scene change is a luminance gradient occurring over a plurality of image fields.

8. A recordable media device for controlling a MPEG video recording to automatically identify and selectively skip segments of a video signal during a recording session, comprising:
MPEG recording means for recording an MPEG video data on the recording media;
a scene change detector for detecting a scene change;
a processor responsive to each detected scene change for storing in a file a time and record location on said media corresponding to the occurrence of said scene change and for determining an interval between each said detected scene change and at least one preceeding scene change, said interval in each instance defining a video segment; and wherein said processor compares said interval with a range of values associated with commercial advertisements, and identifies a commercial advertisement for controlling a playback presentation when the interval is within the range of values, and identifies a chapter boundary for controlling the playback presentation when the interval is outside the range of values.

9. The device according to claim 8 wherein said MPEG recording means is responsive to said processor for inserting a navigation command on said media in a playback control file to at least one of fast forward and skip said video segment during playback if said interval falls within said range of values associated with commercial advertisements.

10. The device according to claim 8 wherein said MPEG recording means is responsive to said processor for inserting a menu button in a menu file of said recordable media for permitting a user to selectively begin playback of a chapter defined by said video segment if said interval does not fall within said range of values associated with said commercial advertisements.

11. The device according to claim 8 wherein said MPEG recording means is responsive to said processor for creating chapter boundaries within said recordable media responsive to a user chapter up/down command.

12. The device according to claim 8 wherein said record location on said media corresponding to said detected scene change is defined by at least one of a sector and picture start code, and a VOB number.

13. The device according to claim 8 wherein said recording media is selected from the group consisting of a DVD disc, a computer hard drive, magnetic tape and magneto optical discs.

14. The device according to claim 8 wherein said scene change is a luminance gradient occurring over a plurality of image fields.

* * * * *